(12) United States Patent
Chen

(10) Patent No.: US 10,203,776 B2
(45) Date of Patent: Feb. 12, 2019

(54) MOUSE WITH INTERCHANGE CAPABILITY

(71) Applicants: DEXIN ELECTRONIC LTD., Donggaun Guangdong (CN); DEXIN CORPORATION, New Taipei (TW)

(72) Inventor: Yi-Shun Chen, New Taipei (TW)

(73) Assignees: DEXIN ELECTRONIC LTD., Dongguan Guangdong (CN); DEXIN CORPORATION, New Taipei (TW)

( * ) Notice: Subject to any disclaimer, the term of this patent is extended or adjusted under 35 U.S.C. 154(b) by 67 days.

(21) Appl. No.: 15/417,117

(22) Filed: Jan. 26, 2017

(65) Prior Publication Data

US 2018/0210564 A1 Jul. 26, 2018

(51) Int. Cl.
*G09G 5/08* (2006.01)
*G06F 3/0354* (2013.01)

(52) U.S. Cl.
CPC .................. *G06F 3/03543* (2013.01)

(58) Field of Classification Search
CPC combination set(s) only.
See application file for complete search history.

(56) References Cited

U.S. PATENT DOCUMENTS

| | | | |
|---|---|---|---|
| 2011/0069008 A1* | 3/2011 | Kao | G06F 3/03543 345/163 |
| 2013/0120263 A1* | 5/2013 | Liu | G06F 3/03543 345/163 |
| 2018/0157345 A1* | 6/2018 | Wang | G06F 3/0383 |

\* cited by examiner

*Primary Examiner* — Kwin Xie
*Assistant Examiner* — Sosina Abebe
(74) *Attorney, Agent, or Firm* — Li & Cai Intellectual Property (USA) Office

(57) ABSTRACT

A mouse with interchange capability includes a mouse body, a circuit board, an interchangeable module and a button module. The mouse body has an accommodating space, and the circuit board is disposed within the accommodating space. The interchangeable module is coupled to the circuit board. The button module is disposed on the mouse body and vertically movable. The button module has a trigger that activates the interchangeable module when the button module is clicked.

4 Claims, 9 Drawing Sheets

MOUSE WITH INTERCHANGE CAPABILITY

BACKGROUND OF THE INVENTION

1. Field of the Invention

The present invention relates to a mouse; in particular, to a mouse with interchange capability according to users' different needs.

2. Description of Related Art

A keyboard and mouse are the most common input devices for conventional computers. Conventional mouse devices have at least a left button, a right button, and a scroll between the two buttons. There are many popular video games available in the market. There are also many game players who host public livestreams on the Internet, which also attracts popularity. Some of the players are so skillful that they turn playing games into a profession, i.e., professional gamers. During a gameplay session, the mouse may be clicked for at least hundreds, if not thousands, of times. Conventional mouse devices only output a digital signal. Therefore, it is not possible to accomplish delicate controls with conventional mouse devices.

In this regard, the applicant of the present invention provides a solution to address the aforementioned drawback.

SUMMARY OF THE INVENTION

An object of the present invention is to provide a mouse having interchangeable modules to allow a user to customize their mouse, thus making the mouse suitable for games requiring delicate controls in order to meet different needs of the user.

In one aspect/configuration of a mouse with interchange capability according to the present disclosure, the mouse includes a mouse body, a circuit board, an interchangeable module and a button module. The mouse body has an accommodating space in which the circuit board is disposed. The interchangeable module is coupled to the circuit board. The button module is disposed on the mouse body and vertically movable. The button module has a trigger that activates the interchangeable module when the button module is clicked.

In another aspect/configuration of the mouse with interchange capability according to the present disclosure, the mouse includes a mouse body, a circuit board, an interchangeable module and a button module. The mouse body has an accommodating space. The circuit board is disposed within the accommodating space and provided with a joint base. The interchangeable module is detachably disposed on the joint base. The button module is disposed on the mouse body and is vertically movable. The button module has a trigger that activates the interchangeable module when the button module is clicked. The interchangeable module is an analog switch module that is configured to generate an analog signal and provided with an elastic element, a magnetic sensor, a base board, a magnetic element and a lifting board. Two ends of the elastic element are respectively disposed at a bottom surface of the lifting board and a top surface of the base board. The magnetic sensor is disposed at the top surface of the base board, and the magnetic element is disposed at the bottom surface of the lifting board. The lifting board is positioned beneath the trigger. The magnetic sensor is a Hall effect sensor and the magnetic element is a magnet. The magnetic sensor and the magnetic element are arranged opposite to and spaced apart from each other in an up-down direction such that the magnetic sensor can detect a relative distance between the magnetic sensor and the magnetic element and accordingly generate the analog signal when the lifting board with the magnetic element is pressed by the trigger.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

[First Embodiment]

Figure 1:
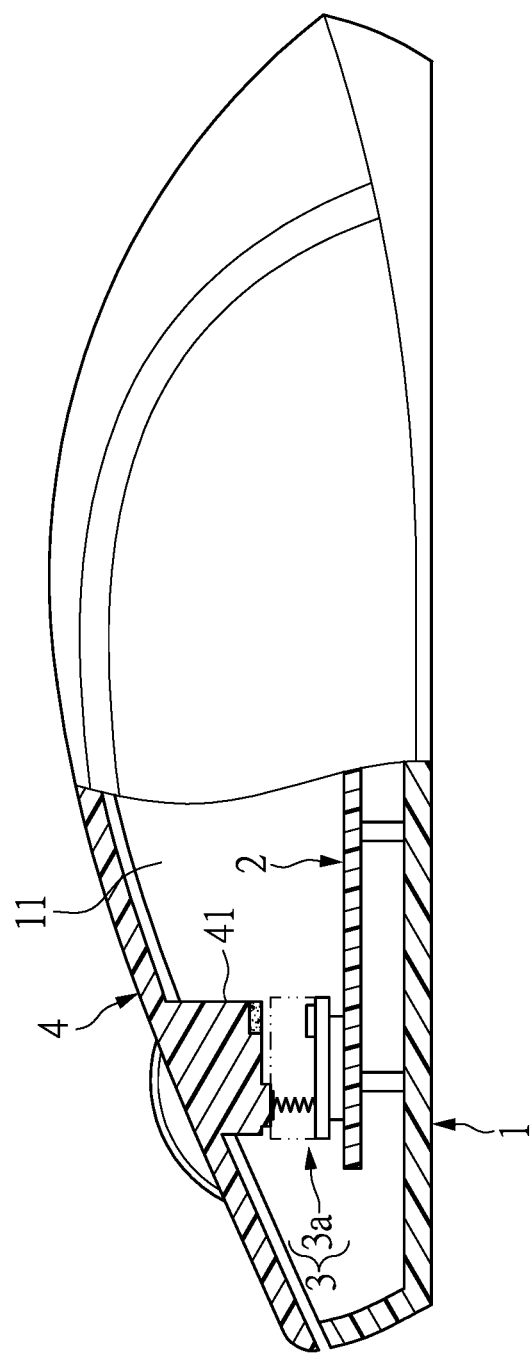
FIG. 1 shows a plan view of a mouse according to a first embodiment of the present invention.
Figure 2:
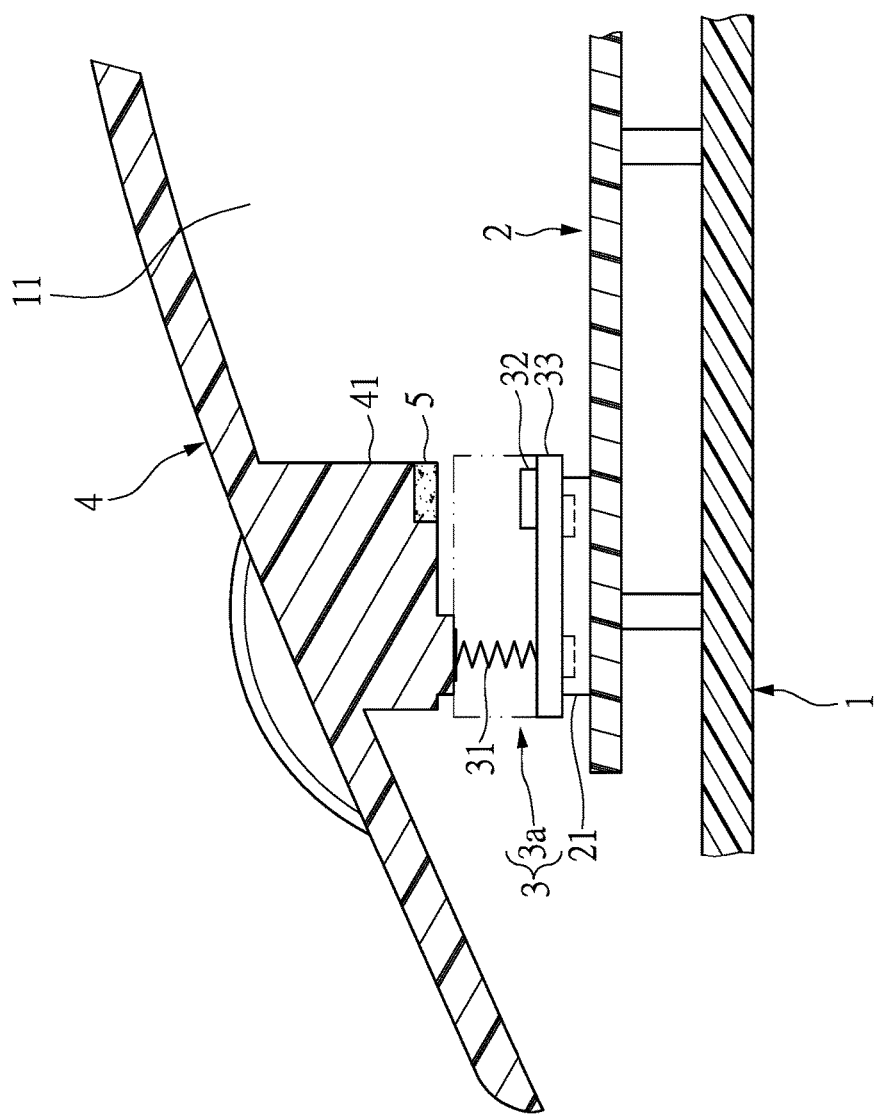
FIG. 2 shows a plan view of the local structure of a mouse according to the first embodiment of the present invention.

Referring to FIG. 1 and FIG. 2, a mouse with interchange capability in the present invention includes a mouse body 1, a circuit board 2, an interchangeable module 3 and a button module 4.

The mouse body 1 has an accommodating space 11 that houses the circuit board 2 and the interchangeable module 3. The circuit board 2 can be, but is not limited to, a circuit substrate with a microcontroller, or a plurality of integrated circuit (IC) boards coupled to one another. The interchangeable module 3 is detachably disposed on the circuit board 2 and electrically connected therewith. The button module 4 is disposed on the mouse body 1, and the button module 4 is vertically movable. A trigger 41 is disposed at the medial side of the button module 4 and above to the interchangeable module 3. The trigger 41 activates the interchangeable module 3 by clicking the button module 4.

Conventionally, the button module 4 has a left button and a right button, thus the number of the interchangeable module 3 can be two in correspondence therewith. However, the present invention does not intend to limit the number of the interchangeable module 3 and button module 4.

The accommodating space 11 is the space within the mouse body 1, which also houses the components known in conventional mouse devices that are not described in the present embodiment, such as but not limited to an optical module and scroll wheel.

In the present embodiment, the interchangeable module 3 is an analog switch module 3a which is configured to generate an analog signal and provided with an elastic element 31, a magnetic sensor 32 and a base board 33. The elastic element 31 and the magnetic sensor 32 are disposed on a top surface of the base board 33. The elastic element 31 can be, but is not limited to, a conical spring or a blade spring. The elastic element 31 in the present embodiment is a conical spring. The elastic element 31 is positioned beneath the trigger 41, and the elastic element 31 can be abutted against and deformed by the trigger 41 when the button module 4 is clicked, thus providing stable elastic connection. The trigger 41 in the present embodiment is provided with a magnetic element 5 that can be embedded in a corner of the trigger 41, so that the magnetic element 5 can be movable with the trigger 41. The magnetic element 5 and the magnetic sensor 32 are arranged opposite to and spaced apart from each other in the up-down direction. When the button module 4 is pressed, the magnetic element 5 is movable synchronously with the trigger 41, and a distance between the magnetic sensor 32 and the magnetic element 5 is changed, so that the magnetic sensor 32 can detect the relative distance between the magnetic sensor 32 and the magnetic element 5 and accordingly generate an analog signal.

In practice, the magnetic sensor 32 can be a Hall effect sensor, and the magnetic element 5 can be a magnet. Therefore the magnetic sensor 32 and the magnetic element 5 can achieve a stepless pressure sensing similar to an L2/R2 button on a gamepad by the magnetic induction mechanism. The mouse in the present embodiment offers pressure sensing according to a clicking force from a user, thus the mouse is suitable for games requiring delicate controls. The analog signal can simulate the level of exertion. Therefore, the analog signal achieves a precise movement simulation, such as throwing, punching, kicking, running, jumping, rolling.

In addition, the circuit board 2 is provided with a joint base 21, and the interchangeable module 3 is detachably disposed on the joint base 21 and electrically connected to the circuit board 2. In practice, the interchangeable module 3 and the joint base 21 can be engaged to each other through coupling structures such as coupling female portions (e.g., grooves, slots, pin holes) and the corresponding coupling male portions (e.g., tabs, hooks, pins) or other coupling structures providing similar engagement or coupling between two coupling portions for making mechanical and electrical connections.

[Second Embodiment]

Figure 3:
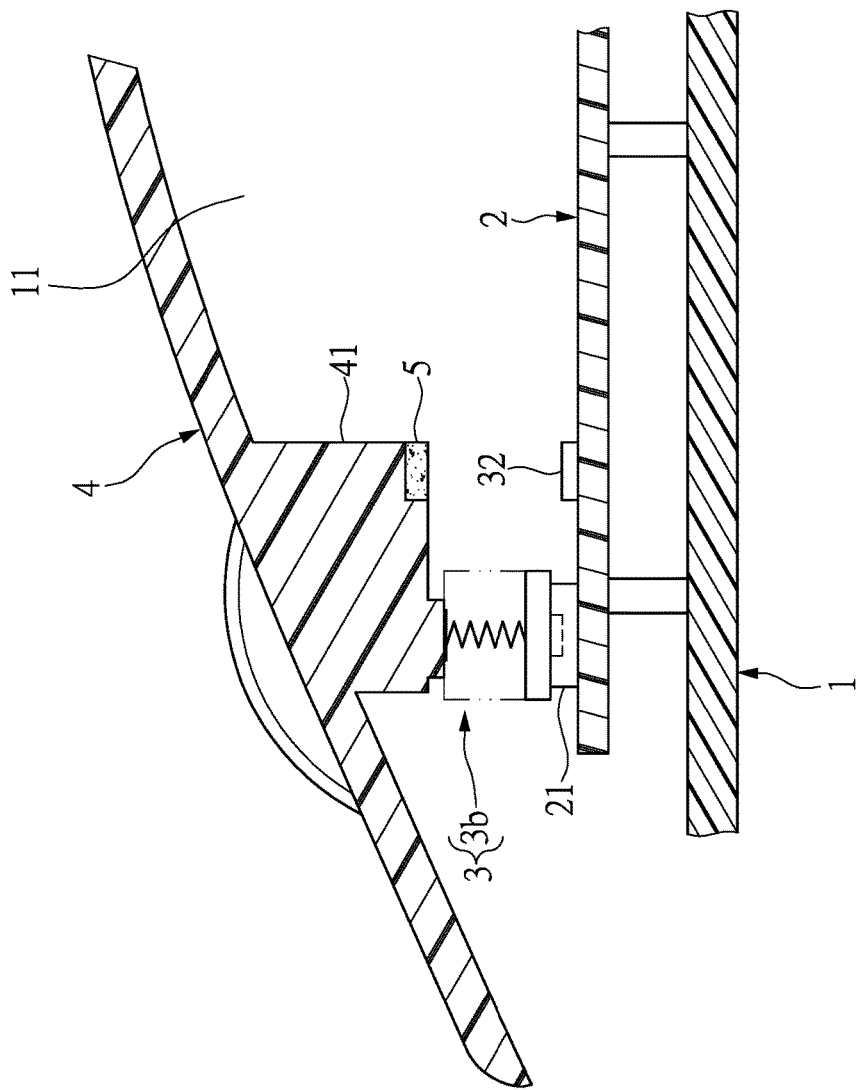
FIG. 3 shows a plan view of the local structure of a mouse according to a second embodiment of the present invention.

Refer to FIG. 3, which shows the second embodiment of the present invention. The present embodiment is similar to the first embodiment described above, so that the same reference numbers used in the previous drawing will be used to refer to the same or like parts. The main difference between the present embodiment and the first embodiment is that the interchangeable module 3 is provided without the magnetic sensor 32 shown in FIG. 2, namely, the magnetic sensor 32 in the present embodiment can be disposed on the top surface of the circuit board 2. The magnetic sensor 32 and the magnetic element 5 are arranged opposite to and spaced apart from each other in the up-down direction. Of course, the magnetic sensor 32 and the magnetic element 5 may also be staggered up and down. In conclusion, the interchangeable module 3 in the present embodiment is merely an elastic module 3b that is configured to provide a stable and balanced movement of the trigger 41.

[Third Embodiment]

Figure 4:
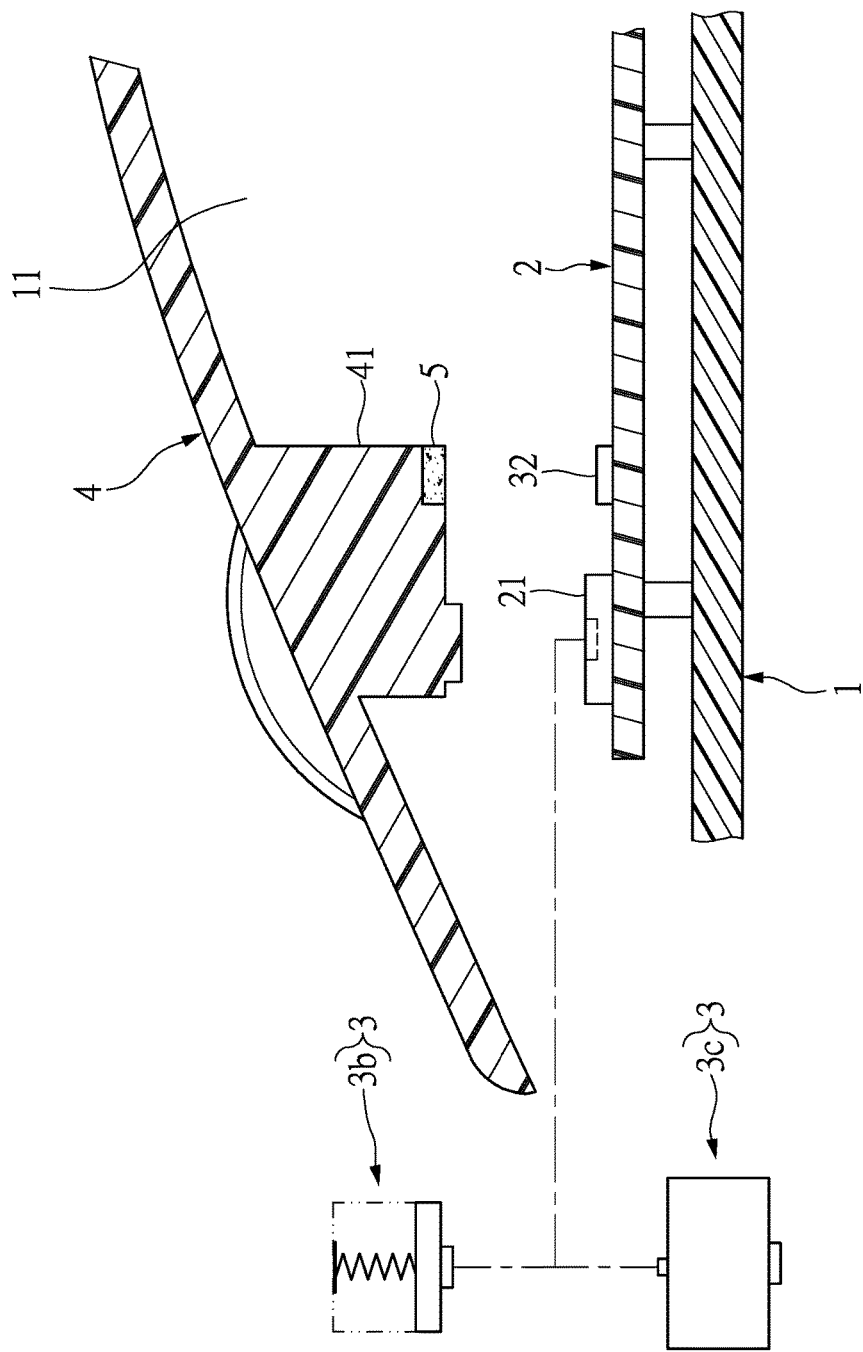
FIG. 4 shows an operation diagram of a mouse according to an embodiment of the present invention.
Figure 5:
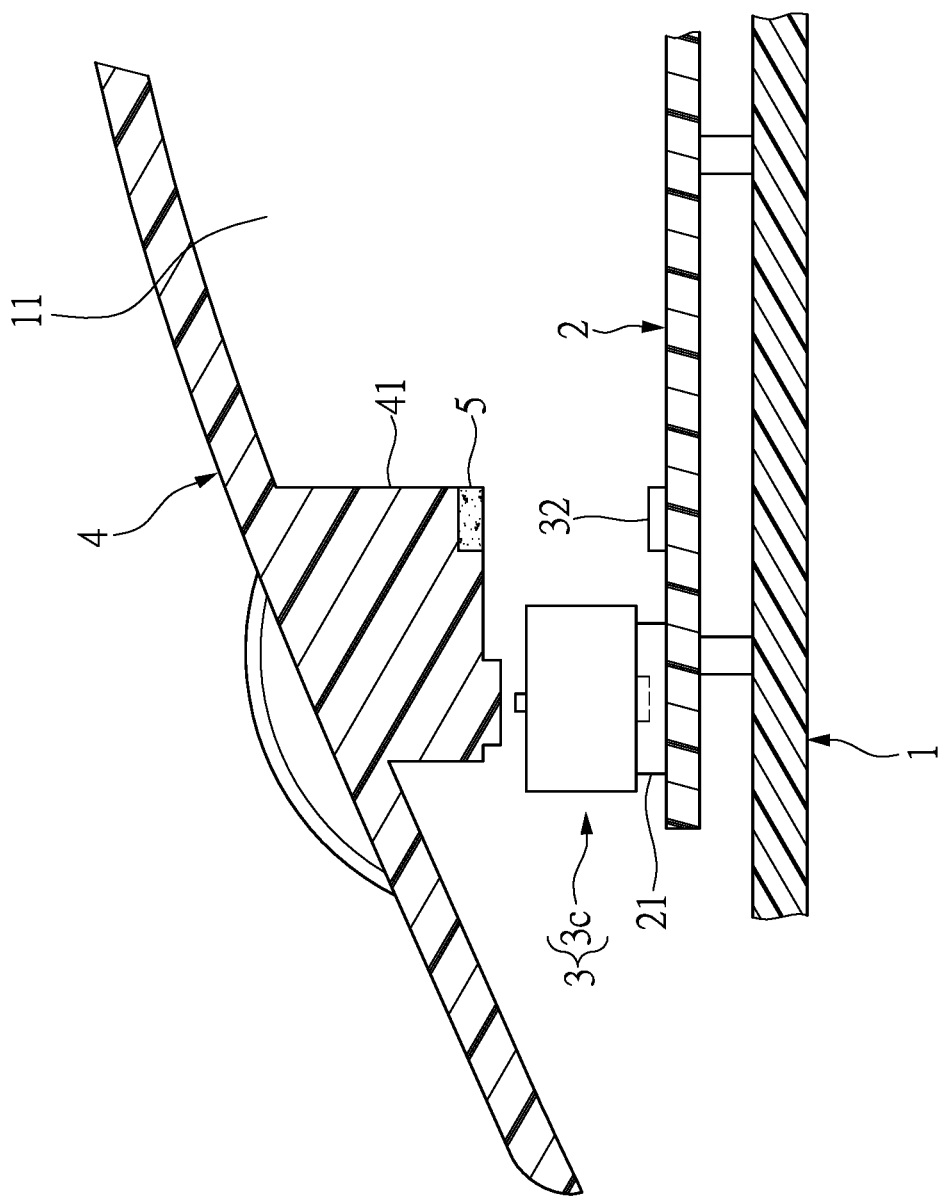
FIG. 5 shows a plan view of the local structure of a mouse according to a third embodiment of the present invention.

Refer to FIG. 4 and FIG. 5, which show the third embodiment of the present invention. The present embodiment is similar to the second embodiment described above, so that the same reference numbers used in the previous drawing will be used to refer to the same or like parts. The main difference between the present embodiment and the second embodiment is that at least one interchangeable module 3 in the present embodiment is a digital switch module 3c configured to generate a digital signal. The digital switch module 3c is detachably disposed on the joint base 21 and electrically connected to the circuit board 2. In practice, the digital switch module 3c can be, for example, a conventional micro switch module used to generate a digital signal in response to a click cycle from a user. Therefore, the user can replace either the digital switch module 3c or the elastic module 3b to meet different needs.

[Fourth Embodiment]

Figure 6:
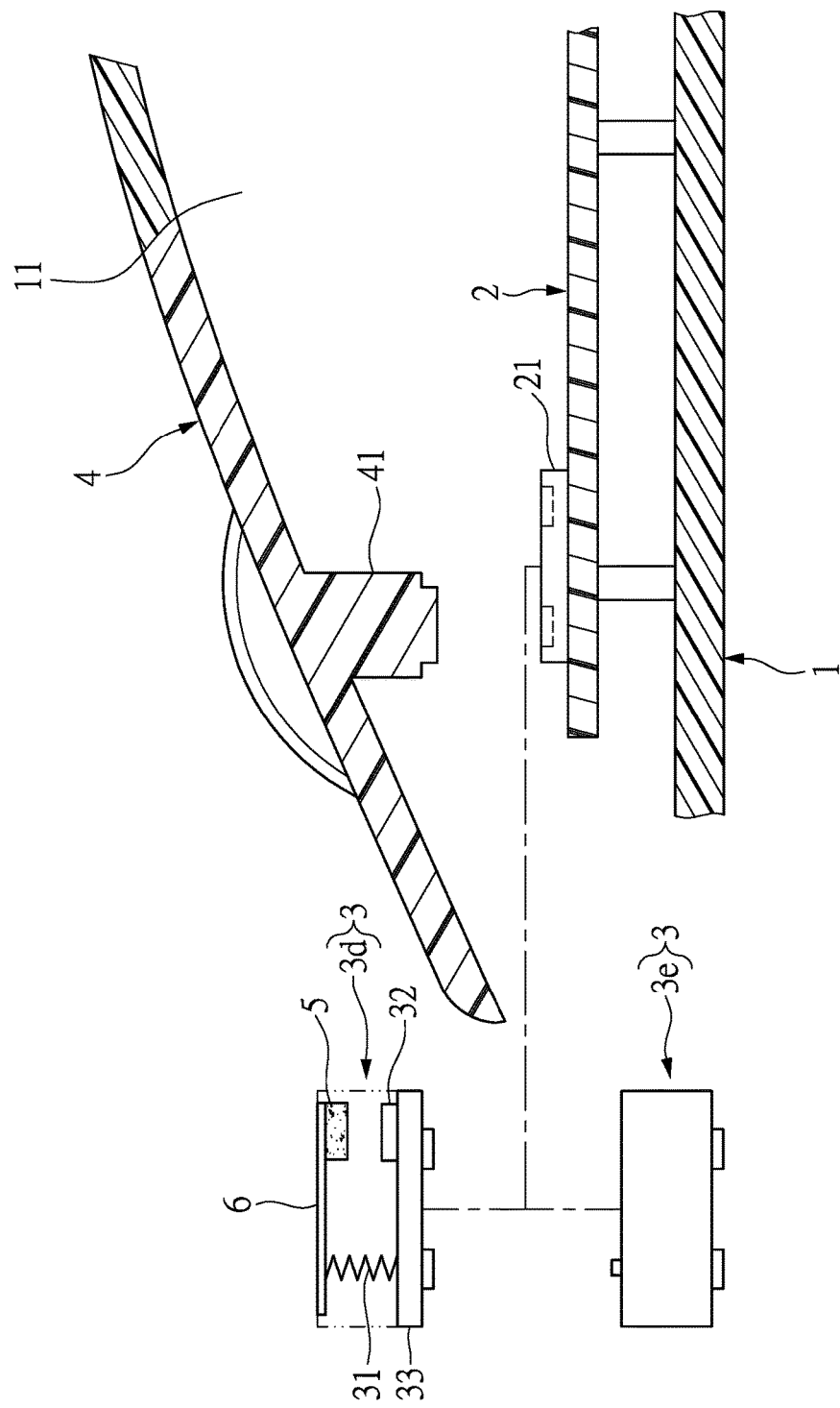
FIG. 6 shows an operation diagram of a mouse according to an embodiment of the present invention.
Figure 7:
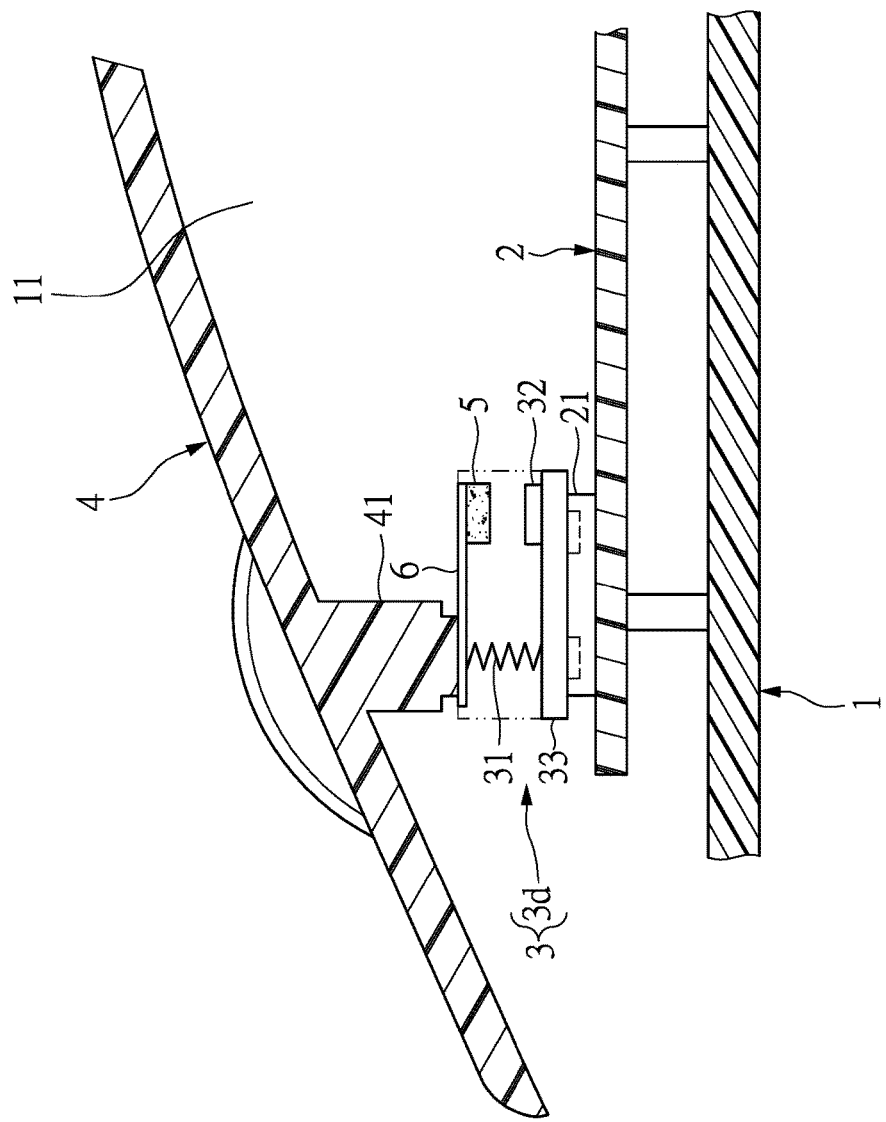
FIG. 7 shows a plan view of the local structure of a mouse according to a fourth embodiment of the present invention.

Refer to FIG. 6 and FIG. 7, which show the fourth embodiment of the present invention. The present embodiment is similar to the first embodiment described above, so that the same reference numbers used in the previous drawing will be used to refer to the same or like parts. The main difference between the present embodiment and the first embodiment is that at least one interchangeable module 3 in the present embodiment is an analog switch module 3d which is configured to generate an analog signal and provided with a magnetic element 5 vertically movable therein. In detail, the analog switch module 3d is provided with an elastic element 31, a magnetic sensor 32, a base board 33, a magnetic element 5 and a lifting board 6. Two ends of the elastic element 31 are respectively disposed at the bottom surface of the lifting board 6 and the top surface of the base board 33. That is, the bilateral ends of the elastic element 31 contact with the bottom surface of the lifting board 6 and the top surface of the base board 33 respectively. The magnetic sensor 32 is disposed at the top surface of the base board 33. The magnetic element 5 is disposed at the bottom surface of the lifting board 6 and spaced apart from the magnetic sensor 32 in the up-down direction. The elastic element 31 is positioned beneath the trigger 41 and can be abutted against the trigger 41 through the lifting board 6. When the lifting board 6 is pressed down by the trigger 41, the magnetic element 5 is vertically movable with the lifting board 6. When the lifting board 6 is released by the trigger 41, the elastic force of the elastic element 31 returns the lifting board 6 to its original position. While the vertical movement lowers or raises the lifting board 6, the relative distance between the magnetic sensor 32 and the magnetic element 5 is changed, so that the magnetic sensor 32 can detect the relative distance between the magnetic sensor 32 and the magnetic element 5 due to Hall-effect and accordingly generate an analog signal. Therefore, the user can replace either the analog switch module 3d or the digital switch module 3e to meet different needs.

[Fifth Embodiment]

Figure 8:
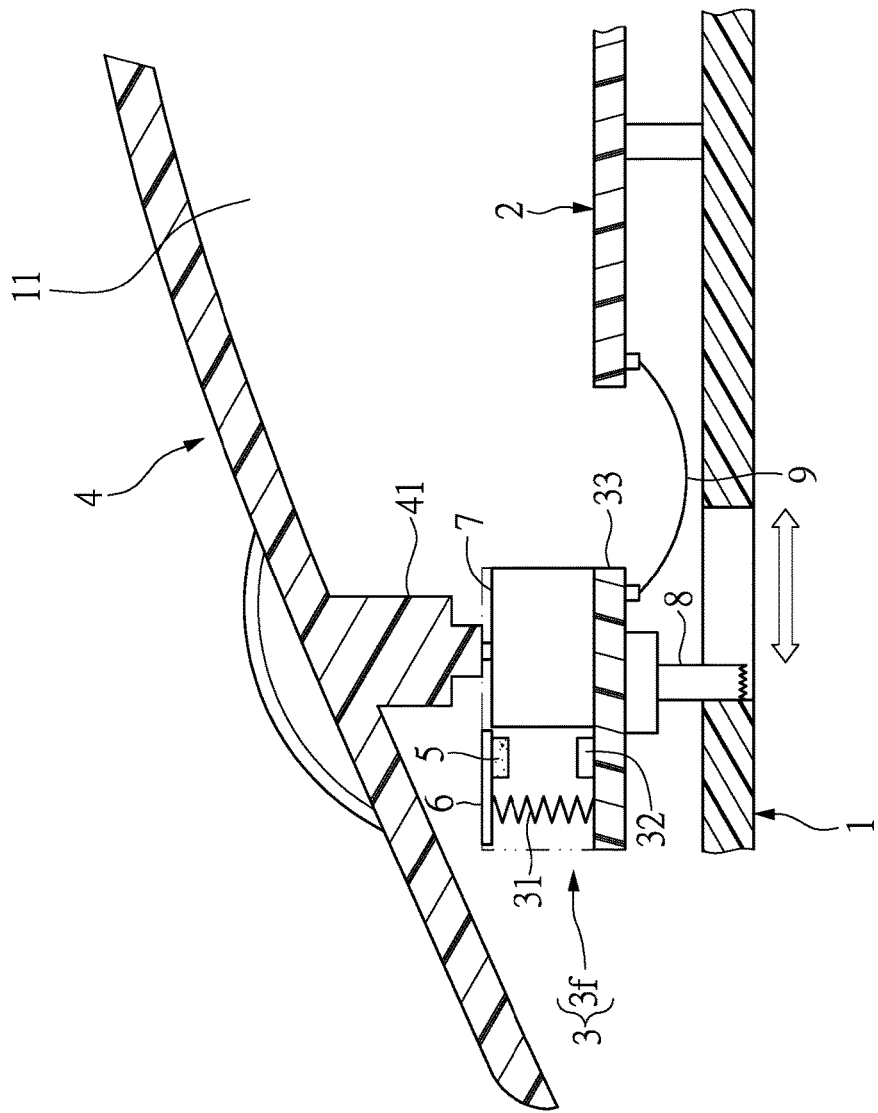
FIG. 8 shows a plan view of the local structure of a mouse according to a fifth embodiment of the present invention.
Figure 9:
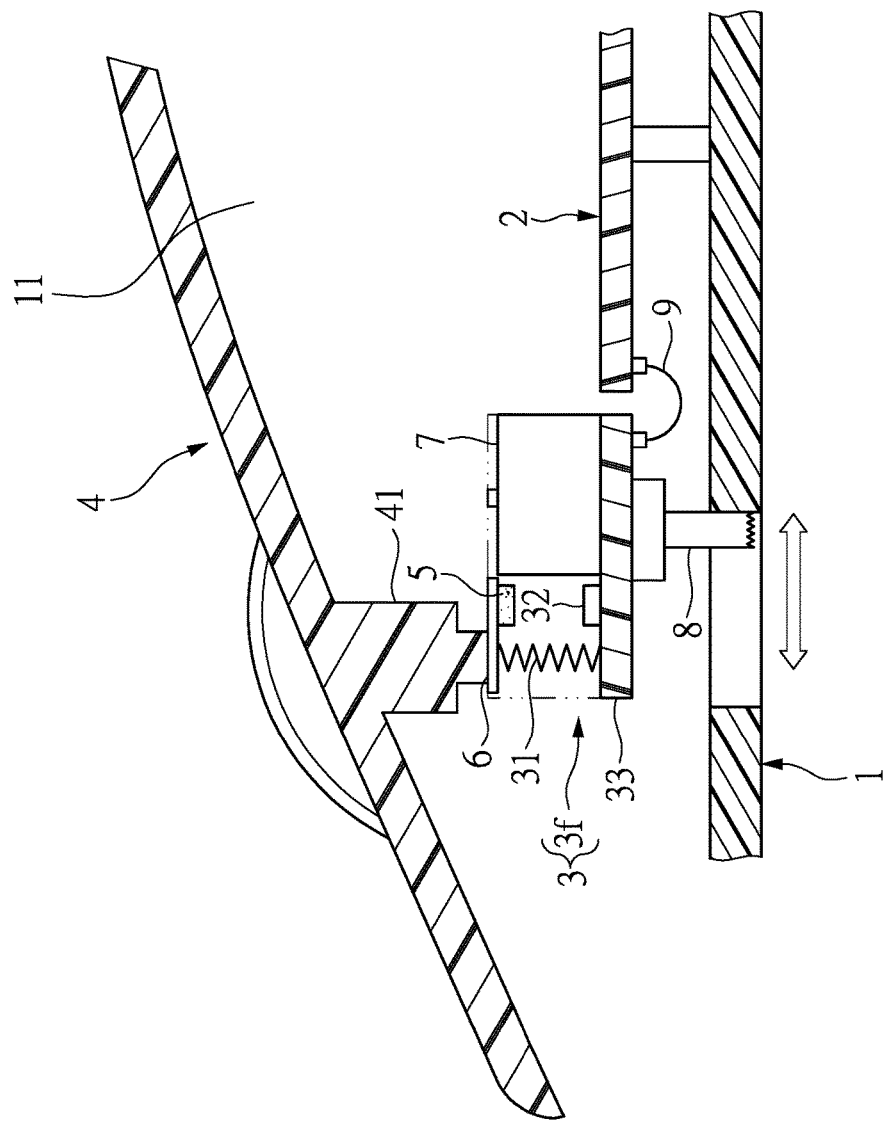
FIG. 9 shows a plan view of the local structure of a mouse according to the fifth embodiment of the present invention.

Refer to FIG. 8 and FIG. 9, which show the fifth embodiment of the present invention. The present embodiment is similar to the fourth embodiment described above, so that the same reference numbers used in the previous drawing will be used to refer to the same or like parts. The main difference between the present embodiment and the fourth embodiment is that at least one interchangeable module 3 in the present embodiment is a switch module 3f which is configured to generate an analog signal or a digital signal and provided with an elastic element 31, a magnetic sensor 32, a base board 33, a magnetic element 5, a lifting board 6, a micro switch 7 and a movable switch 8. Two ends of the elastic element 31 are respectively disposed at the bottom surface of the lifting board 6 and the top surface of the base board 33. The magnetic sensor 32 and the micro switch 7 are disposed at the top surface of the base board 33. The magnetic element 5 is disposed at the bottom surface of the lifting board 6 and spaced apart from the magnetic sensor 32 in the up-down direction. The movable switch 8 is disposed at the bottom surface of the base board 33. The base board 33 can be coupled to the circuit board 2 through the cable connector 9. The movable switch 8 is configured to cause either the lifting board 6 or the micro switch 7 to abut against the trigger 41. In detail, the movable switch 8 can be, but is not limited to, a push type switch for pushing the base board 33 to move linearly, so that the trigger 41 can be abutted against either the lifting board 6 or the micro switch 7. The switch module 3f generates an analog signal when the lifting board 6 is pressed by the trigger 41. On the other hand, the switch module 3f generates a digital signal when the micro switch 7 is actuated by the trigger 41. Therefore, the switch module 3f can be detachably coupled to the circuit board 2 through the cable connector 9, and it also can be switched between a first usage mode that is capable of generating a digital signal, and a second usage mode that is capable of generating an analog signal by way of the movable switch 8 in order to meet different needs.

The descriptions illustrated supra set forth simply the preferred embodiments of the present invention; however, the characteristics of the present invention are by no means restricted thereto. All changes, alterations, or modifications conveniently considered by those skilled in the art are deemed to be encompassed within the scope of the present invention delineated by the following claims.

What is claimed is:
1. A mouse with interchange capability, comprising:
a mouse body with an accommodating space;
a circuit board disposed within the accommodating space;
an interchangeable module coupled to the circuit board; and
a button module disposed on the mouse body, the button module being vertically movable and having a trigger, the trigger activating the interchange module when the button module is clicked;
wherein the circuit board is provided with a joint base and the interchangeable module is detachably disposed on the joint base;
wherein the trigger is provided with a magnetic element; and
wherein the interchangeable module is an elastic module configured to provide elastic force to the trigger, the circuit board is provided with a magnetic sensor configured to generate an analog signal, the magnetic sensor is a Hall effect sensor and the magnetic element is a magnet, the magnetic sensor and the magnetic element are arranged opposite to and spaced apart from each other in an up-down direction such that the magnetic sensor can detect a relative distance between the magnetic sensor and the magnetic element and accordingly generate the analog signal when the trigger with the magnetic element is pressed.

2. A mouse with interchange capability, comprising:
a mouse body with an accommodating space;
a circuit board disposed within the accommodating space and provided with a joint base;
an interchangeable module detachably disposed on the joint base; and
a button module disposed on the mouse body, the button module being vertically movable and comprising a trigger for activating the interchangeable module when the button module is clicked;
wherein the interchangeable module is an analog switch module configured to generate an analog signal and provided with an elastic element, a magnetic sensor, a base board, a magnetic element and a lifting board, and wherein two ends of the elastic element are respectively disposed at a bottom surface of the lifting board and a top surface of the base board, the magnetic sensor is disposed at the top surface of the base board and distal form the elastic element, the magnetic element is disposed at the bottom surface of the lifting board and distal from the elastic element, the lifting board is positioned beneath the trigger, the magnetic sensor is a Hall effect sensor and the magnetic element is a magnet, the magnetic sensor and the magnetic element are arranged opposite to and spaced apart from each other in an up-down direction such that the magnetic sensor can detect a relative distance between the magnetic sensor and the magnetic element and accordingly generate the analog signal when the lifting board with the magnetic element is pressed by the trigger.

3. A mouse with interchange capability, comprising:
a mouse body with an accommodating space;
a circuit board disposed within the accommodating space;
an interchangeable module coupled to the circuit board; and
a button module disposed on the mouse body, the button module being vertically movable and having a trigger, the trigger activating the interchange module when the button module is clicked;
wherein the interchangeable module is a switch module configured to generate an analog signal or a digital signal and provided with an elastic element, a magnetic sensor, a base board, a magnetic element, a lifting board, a micro switch and a movable switch, and wherein two ends of the elastic element are respectively disposed at a bottom surface of the lifting board and a top surface of the base board, the magnetic sensor and the micro switch are disposed at the top surface of the base board, the magnetic element is disposed at the bottom surface of the lifting board, the magnetic sensor and the magnetic element are arranged opposite to and spaced apart from each other in an up-down direction, the magnetic sensor is a Hall effect sensor and the magnetic element is a magnet, the movable switch is disposed at the bottom surface of the base board, the base board is coupled to the circuit board, the movable switch is configured to cause either the lifting board or the micro switch to be positioned beneath the trigger such that the interchangeable module selectively generates either the analog signal or the digital signal when the trigger is pressed.

4. The mouse with interchange capability according to claim 3, wherein the movable switch is a push type switch for pushing the base board to move linearly.

* * * * *